Jan. 7, 1969  C. G. MATSON  3,420,480

UNIVERSAL VIBRATOR MOUNT

Filed Feb. 27, 1967  Sheet 1 of 2

INVENTOR.
C. G. MATSON

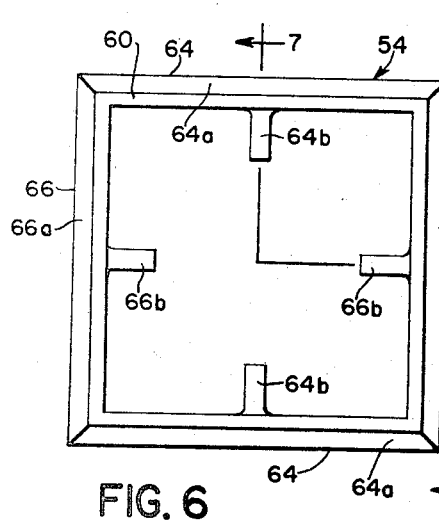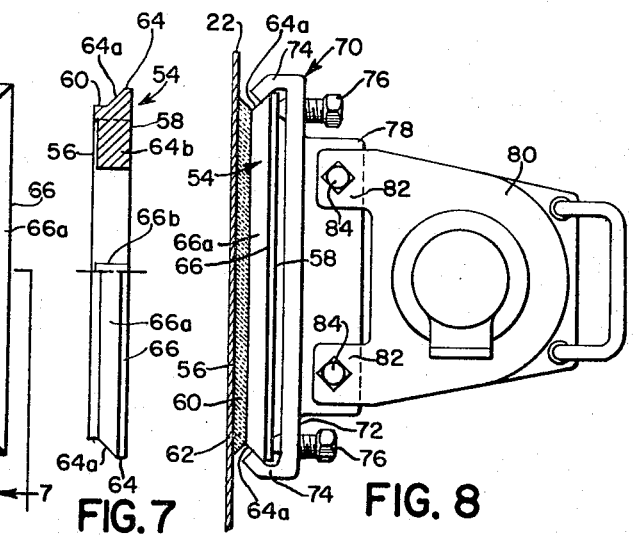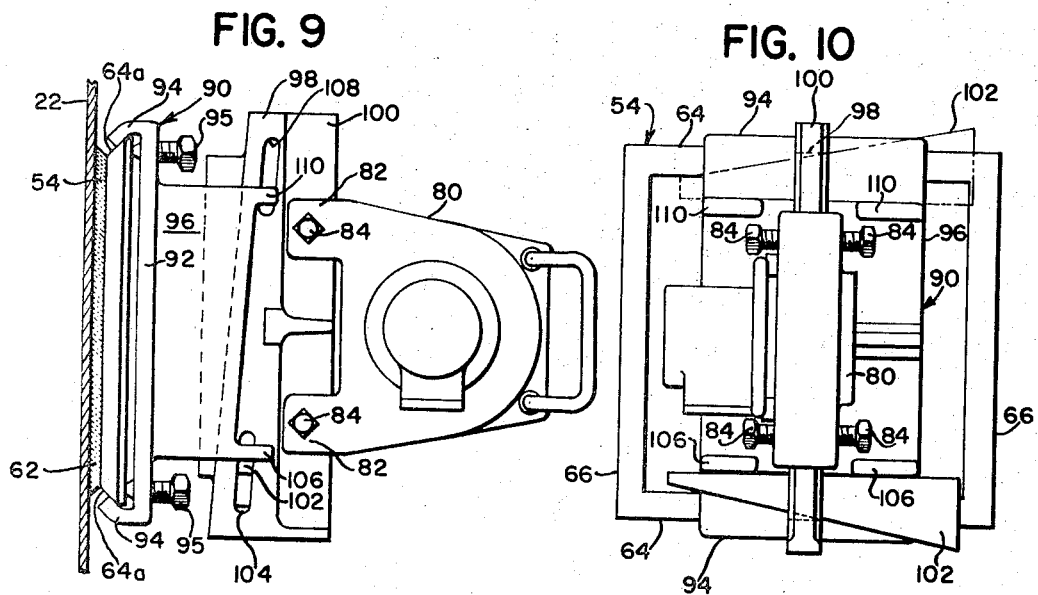

United States Patent Office 3,420,480
Patented Jan. 7, 1969

3,420,480
UNIVERSAL VIBRATOR MOUNT
Carl G. Matson, 401 E. Central Blvd.,
Kewanee, Ill. 61443
Filed Feb. 27, 1967, Ser. No. 618,780
U.S. Cl. 248—14                                    10 Claims
Int. Cl. F16m 13/02; B65g 67/24

ABSTRACT OF THE DISCLOSURE

A universal vibrator mount for rigid, preferably permanent attachment to an object to be vibrated in connection with the unloading, settling, flowing, etc. of fluent, particulate etc. material, the mount being of substantial size as compared with the area of the container etc. wall to which it is attached and having one or more pairs of divergent clamp surfaces to which various types of vibrators or vibrator clamps may be attached.

Background of the invention

The use of vibrators for the handling etc. of materials of the type and in the environments set forth above is of course old and well known. The problems in the general field are many, largely because of duty requirements, substantial forces involved etc., all of which lead to complications in attaching the vibrators to the object to be vibrated. The conventional railway hopper car is typical of an area in which these problems have become acute and in the past many systems of attachments have been devised and used, characterized mainly in using structural parts of the car as mounting ribs etc. for attaching the vibrators. It has been found that these parts lack strength, especially in heavy-duty operations and one attempt to solve the problem has relied upon the temporary welding of additional ribs etc. to the car. Each installation presents a special case and it becomes difficult to match vibrators and/or vibrator clamps with the various types of mountings. Further, the temporary weldments are often of such nature as to interfere with normal operation of the cars, especially in transit, because they present obstacles to free movement of the cars through narrow areas.

Summary of the invention

The present invention provides, in brief, a universal mount especially designed for attachment to a railway hopper car or like container and comprises a structural member of relatively heavy metal of substantially plate-like configuration having inner and outer faces of substantial area, the inner face being designed for welding or the like to an upright wall, for example, of the car etc. and the member further having at least a pair of diametrically opposed clamping surfaces provided respectively on opposed marginal edges of the member, which surfaces are outwardly divergent from the inner face to the outer at angles of substantially 45°, thereby providing for the simple clamping thereto of a vibrator and/or vibrator adapter having mating clamping portions. As an alternative, various forms of vibrator adapters having comparable mating clamping portions may be solidly attached to the member and various forms of vibrators may be secured to the member. Further, the member may be in the form of a regular polygonal structure having a plurality of similar pairs of opposed clamp surfaces, enabling the vibrator to be clamped thereto in any one of several selected positions so as to vary the line along which the vibratory forces are exerted. Still further, the member may be constructed with a plurality of integrated marginal edge portions of bar-like nature, giving the member a frame-like construction having a substantially open center and these bar-like edge portions are provided with integral ribs matched in diametrically alined pairs to present further mounting portions whereby the versatility of the mount is considerably extended.

Description of the drawings

FIGURE 6 is a face view of another form of mounting vibrator;

FIGURE 7 is a section on the line 7-7 of FIGURE 6;

FIGURE 8 is a partially sectioned view showing the member of FIGURE 6 in conjunction with an adapter and a vibrator mounted thereon;

FIGURE 9 illustrates the structure of FIGURE 6 in conjunction with another form of adapter; and FIGURE 10 is an elevation of the structure shown in FIGURE 9.

Description of the preferred embodiments

Figure 1:
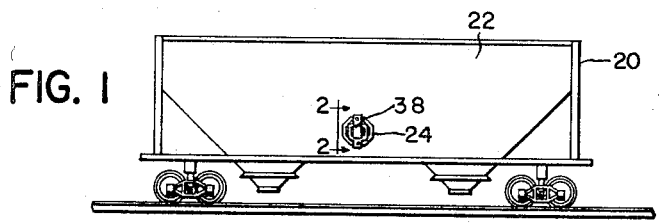
FIGURE 1 is a small-scale elevation of a typical railway hopper car equipped with one form of the invention.

In FIGURE 1, a typical railway hopper car 20 is shown as representative of a container, receptacle or equivalent object with which the invention may be used. The body of this car is made up conventionally of walls, a side wall of which is indicated at 22 as being formed of sheet steel. Any one or more of these walls may be equipped with the universal vibrator mount and system provided according to the invention, but for purposes of simplicity and clarity only one such area is shown as being so equipped, it being clear of course that the mount may be duplicated at will. The basic part of the universal mount is a rigid member 24 of relatively heavy metal construction of substantially plate-like configuration, which may be a casting or forging so constructed as to have relatively closely spaced apart inner and outer faces 26 and 28 and a plurality of diametrically opposed peripheral edge portions that function respectively as pairs 30—30, 32—32, 34—34, and 36—36, the member here being in the form of a regular octagon so as to provide four such pairs of portions.

Figure 2:
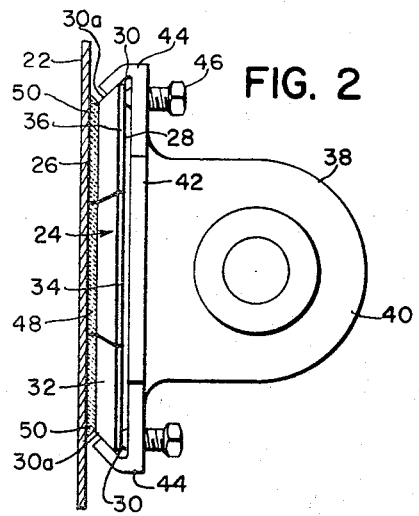
FIGURE 2 is an enlarged section on the line 2-2 of FIGURE 1.
Figure 3:
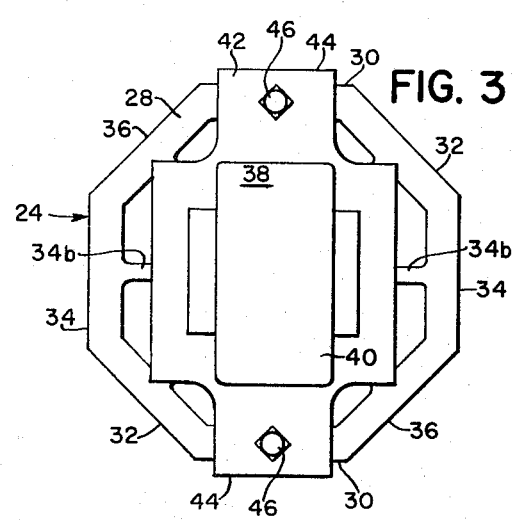
FIGURE 3 is an elevation of and on the same scale as FIGURE 2.

These portions are provided respectively with a clamp surface 30a, 32a, 34a and 36a, opposed pairs of which diverge outwardly away from the inner face 26, preferably at an angle of 45°. Selected pairs of these portions enable the rigid but removable mounting on the member 24 of a vibrator unit such as that indicated at 38 in FIGURES 1-3. This vibrator may be of any type, that shown being typical of the eccentric rotary nature, powered by compressed air, for example, the details of which are not specifically significant here. This vibrator may comprise a suitable generally cylindrical casing 40 integral with a base clamp 42 that has clamping ears 44 respectively integral with opposite ends thereof and spaced equidistantly from the axis of rotation of the eccentric (not shown) within the casing 40. These ears are shaped to fit the respective clamp surfaces 30a, 30a etc., having a sliding fit therewith from side to side; and rigid but removable retention of the unit is effected by a pair of clamping cap screws 46, each of which is threaded through a suitable tapped bore in the vibrator base 42 for engagement with the outer face 28 of the member 24. Because of the 45° clamping angle between the clamp ears 44 and the selected clamp surfaces 30a—30a etc., the unit has remarkable holding power and the clamp screws need furnish only a portion—say, a third—of the clamping force required to hold the unit 38 in place on the member 24.

The member 24, about the periphery of its inner face 26, is bordered by a narrow peripheral portion 48 which spaces the inner-face-proximate portions of the clamping surfaces 30a—30a etc. somewhat outwardly from the outer face of the car wall 22 so as to provide ample space for applying a peripheral welding bead, as at 50, to permanently affix the member 24 to the car wall. Thus the welding bead will not interfere with the easy mounting and dismounting of the vibrator unit 38 from the member. As will be seen, the vibrator unit 38 may be mounted on the member 24 in three other positions or attitudes besides that shown in the drawings. For example, it may be removed, turned through 45° about the center of the member 24 and then be re-attached by using, say, the clamp surfaces 36—36 etc. This increases the versatility of the system so as to enable the user to vary the directions and lines of vibratory force applied to the object to be vibrated, such as the hopper car chosen here for purposes of illustration.

Figure 4:
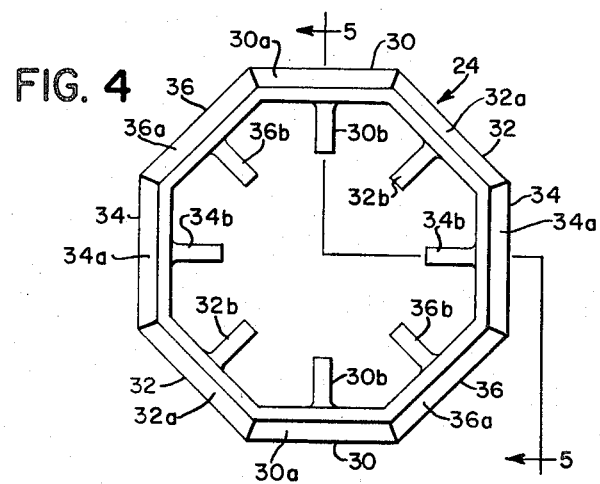
FIGURE 4 is a view of the basic mounting member as seen from its inner face.
Figure 5:
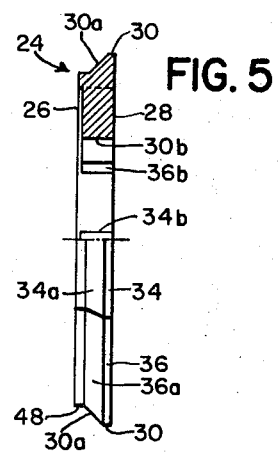
FIGURE 5 is a section on the line 5-5 of FIGURE 4.

As best seen in FIGURE 4, the basic configuration of the member 24 is that it is generally of frame-like or skeletal structure, the portions 30—30 etc. being in the nature of integrated bars which gives the member 24 an open center toward which a plurality of integral ribs or ears 30b—30b, 32b—32b, 34b—34b and 36b—36b project respectively from the portions 30—30, 32—32, 34—34 and 36—36. Since the member 24 is here a regular octagon, there are of course eight such ribs arranged in four pairs of uniform angular spacing about the center of the member. These may be used for the mounting of other forms of vibrator units as will become apparent from the description below. Each rib is spaced outwardly a slight distance from the inner face of the member 24 so that the inner marginal portion of the member as defined by the octagonal "framework" of the portions 30 etc. may receive a welding bead (not shown) internally of the structure and supplementing the bead 50. This increases the effectiveness of the affixiation of the member to the wall 22 and, since the member 24 is of comparatively substantial area it will occupy a similar effective area of the car wall and thus will assure that adequate vibratory forces are transmitted through a substantial portion of the car and will not be undesirably localized. Further features of the invention will become apparent as the description progresses in regard to another form of mounting unit and vibrator adapters usable therewith or with the member 24 just described.

FIGURES 6 and 7 illustrate in detail a mounting member 54 having the same basic construction as the member 24 but here being in the form of a square as representative of another polygonal shape that such members may assume. This member has inner and outer faces 56 and 58, respectively, the inner of which is provided with a marginal narrow edge portion 60 to which a welding bead 62 may be applied to secure the member to a car or similar receptacle, this provision enabling the welding bead to clear clamping surfaces 64a—64a and 66a—66a for easy availability in the mounting of various forms of vibrator units etc. on the member. These surfaces respectively diverge from the inner face of the member and are formed respectively on integrated bar-like portions 64—64 and 66—66 of the member 54, these having comparable configurations as respects the portions 30—30 etc. described above. Also as in the case above, the member has a plurality of uniformly angularly spaced ribs or ears 64b—64b and 66b—66b respectively integral with the bars or portions 64—64 and 66—66.

One form of clamp-on adapter 70 is shown in FIGURE 8 as including a main steel strip-like body 72 having its opposite ends formed as clamp ears 74 for cooperation with the clamp surfaces 64a—64a or 66a—66a, depending upon the angular position chosen for the mounting. Clamp screws 76, similar to those described above, are provided to augment the mounting. Integral with the adapter body 72 is an outstanding elongated rib 78 on which may be removably mounted a vibrator 80, here of the type shown in the U.S. patent to Peterson 2,999,393, for example. This vibrator includes two pairs of spaced apart legs 82 which are adapted to straddle the rib 78, being clamped thereto by opposed pairs of clamping screws 84. This arrangement illustrates further the versatility of the mounting system. Other vibrators may be mounted on the adapter, or the vibrator 80, as well as other types having mounting legs similar to those at 82, may be mounted directly on a selected pair of ribs 64b—64b or 66b—66b. Likewise, a similar mounting may be made on selected pairs of ribs 30b—30b etc. of the mounting member of FIGURES 1–5.

FIGURES 9 and 10 show still another form of adapter usable with the vibrator of FIGURE 8, for example. This adapter, designated by the numeral 90, has a main body 92 having its opposite ends form as clamp ears 94 equipped respectively with clamp screws 95 and cooperable with selected pairs of clamp surfaces 64a—64a or 66a—66a. The body has integral therewith an outstanding pocket structure 96, here for example of the character shown in the U.S. patent to Peterson 3,003,733. This structure is interiorly wedge-shaped to receive a wedge member 98 on which is an integral outstanding elongated rib 100 to which the vibrator 80 may be clamped by its legs and clamp screws 82 and 84. The wedge member is forcibly retained in the pocket structure by a cross wedge 102 driven through a slot 104 in the rib 100 and beneath a pair of lugs 106 on the pocket structure 96. The wedge member 98 is removable from the pocket structure by removing the wedge 102 and replacing it through an upper slot 108 in the member 98 and above a pair of upper lugs 110 on the pocket structure.

The foregoing are but a few examples of how the basic invention may be put to use, following the pattern of providing the universal mount 24 and/or 54 as a permanent attachment to hopper cars, receptacles or other objects to be vibrated. As described before, the divergent clamp surfaces afford substantially increased utility as well as providing the benefits of remarkable clamping forces, thus eliminating at the same time the limited utility of prior art devices and the requirement of constant attention to ascertain whether adequate attachment is being maintained. Because the members 24 and 54 are quite flat or of relatively small thickness, the amount that each, per se, projects from the car etc. is relatively insignificant. Thus dangerous overhanging portions are eliminated that would interfere with the passage of a railway car through narrow areas. Features and advantages other than those enumerated will be apparent to those versed in the art.

I claim:

1. A universal vibrator mount for welded attachment to a metal walled container or the like to be vibrated, comprising a rigid member of relatively heavy metal construction and of substantially plate-like configuration having inner and outer faces and diametrically opposed peripheral edge portions, said inner face being adapted to be rigidly welded to a wall of a container, said edge portions respectively having clamp surfaces diverging outwardly away from said inner face to said outer face respectively at an angle of approximately 45° to provide for the removable clamping of a vibrator to said member.

2. The invention defined in claim 1, in which said member is a polygon providing a plurality of opposed pairs of similar divergent clamp surfaces.

3. The invention defined in claim 2, in which said member is square.

4. The invention defined in claim 2, in which said member is octagonal.

5. The invention defined in claim 2 in which said member has marginal rigidly integrated bar-like elements forming the sides of the polygon and affording a frame-like structure with a substantially open center.

6. The invention defined in claim 5, in which each bar-like element has a rib rigid therewith and projecting therefrom.

7. The invention defined in claim 6, in which said ribs project toward the aforesaid open center.

8. The invention defined in claim 7, in which said ribs are arranged respectively in diametrically alined pairs.

9. The invention defined in claim 7, in which each rib has inner and outer edges, said outer edges lying in the plane of said outer face.

10. The invention defined in claim 8, in which the inner edges of the rib lie in a plane spaced outwardly from the inner face of the member.

References Cited

UNITED STATES PATENTS

| | | | |
|---|---|---|---|
| 496,573 | 5/1893 | Leyner | 248—226 |
| 1,030,090 | 6/1912 | Johnson. | |
| 1,363,321 | 12/1920 | Jaeger | 248—225 X |
| 2,229,037 | 1/1941 | Boldman | 214—64.2 |
| 2,893,676 | 7/1959 | Connors et al. | 248—225 |
| 3,003,733 | 10/1961 | Peterson | 248—224 |
| 3,134,566 | 5/1964 | Beene | 248—223 X |

ROY D. FRAZIER, *Primary Examiner.*

J. FRANKLIN FOSS, *Assistant Examiner.*

U.S. Cl. X.R.

214—64.2; 248—223